455-619 AU 233 EX
FIP8106 OR 3,404,279
EXAMINER 333
Oct. 1, 1968 H. F. MATARÉ 3,404,279
MODULATED LIGHT DETECTOR
Filed April 5, 1965
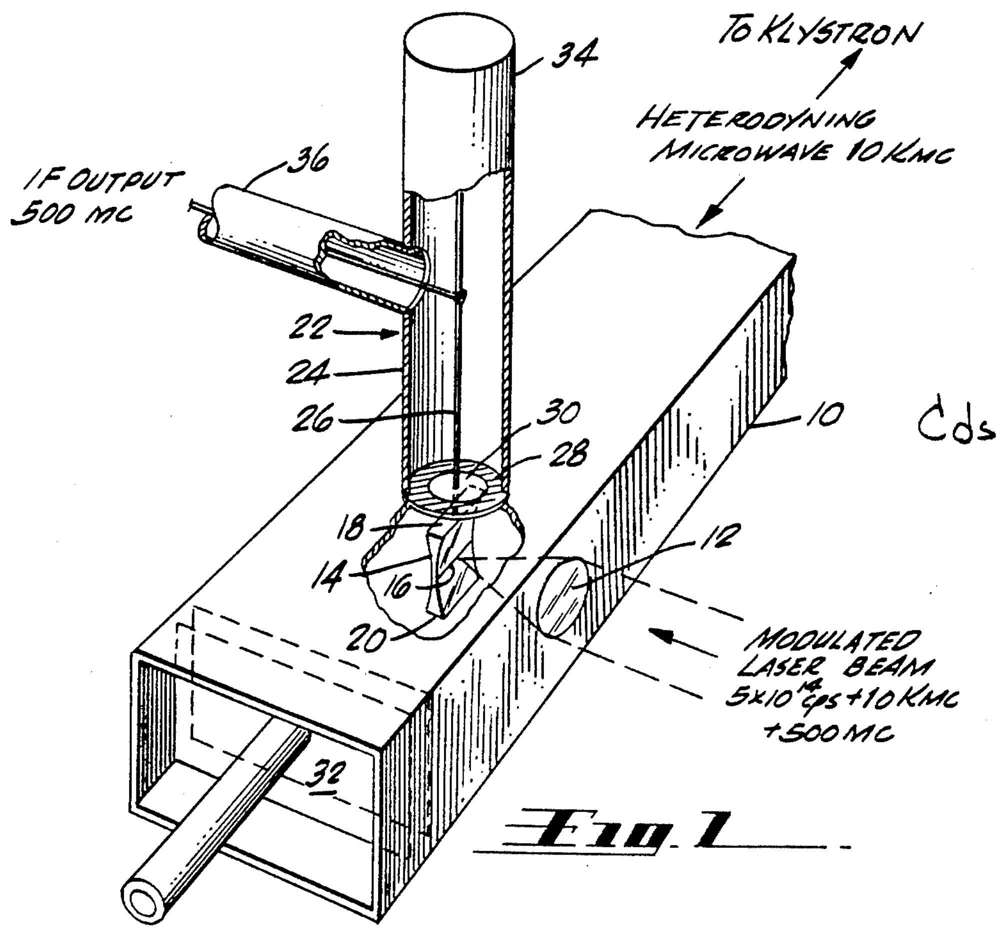
Cds
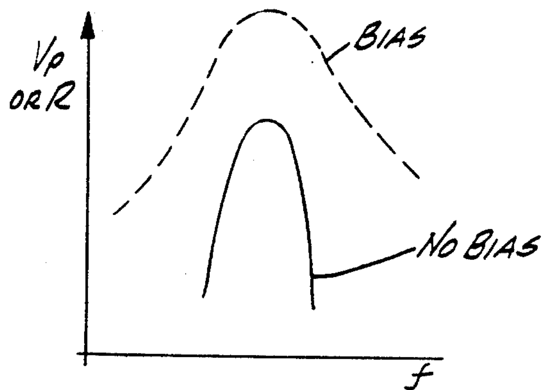
INVENTOR.
HERBERT F. MATARÉ
BY Leon D. Rosen
ATTORNEY United States Patent Office 3,404,279

Patented Oct. 1, 1968

3,404,279

MODULATED LIGHT DETECTOR

Herbert F. Mataré, Pacific Palisades, Calif., assignor, by mesne assignments, to McDonnell Douglas Corporation, Santa Monica, Calif., a corporation of Maryland Filed Apr. 5, 1965, Ser. No. 445,612
5 Claims. (Cl. 250—199)

This invention relates to the detection of modulation signals contained in carrier waves of very high frequency, such as the order of frequency of light waves, and to improvements therein.

Recent developments, particularly in laser devices, have enabled the production of coherent electromagnetic waves of extremely high frequency such as that of visible light. Coherent waves of such high frequencies are of great commercial potential inasmuch as they can be modulated by signals of wide bandwidth such as thousands of megacycles per second, and therefore can readily transmit large quantities of information. In many applications, the modulated coherent light waves are transmitted by line-of-sight paths over great distances. Although laser beams are readily produced having very narrow beam angles, some spreading of beam occurs in addition to absorption, and at long distances the power received is very low. Accordingly, the practical employment of laser beams for communication often necessitates the use of apparatus capable of detecting modulated laser beams of low intensity.

A typical modulated coherent light wave consists of a carrier wave of light frequency such as $10^{14}$ c.p.s. which is amplitude or frequency-modulated by a signal of microwave frequency such as 10 g c.p.s. ($10\times10^9$ c.p.s.), the microwave signal itself being a composite of microwave carrier signals and lower frequency modulating signals. Once the microwave signal is detected, the extraction and use of the information it contains is readily accomplished by many known techniques and devices. However, the detection of the modulating signals of the transmitted light beam is not readily accomplished for light beams of low intensity.

One method for detecting modulating signals of a laser beam involves the projection of a locally produced laser beam on the same spot of a light sensitive detector on which is incident the modulated laser beam to be detected, to produce a beat-frequency output. However, such a method requires laser beams which are extremely stable in frequency and amplitude. Such beams are difficult to provide, and the output from the detector generally contains substantial noise. Detection by heterodyning usually yields the best results, but a different method than using an additional modulated laser beam would appear necessary.

Accordingly, one object of the present invention is to provide an efficient detector for modulated electro-magnetic waves of extremely high frequency.

Another object is to provide a detector for amplitude and/or frequency modulated light beams, which is characterized by a capability to provide output signals of high signal-to-noise ratio in the detection of light beams of low intensity.

Still another object is to provide more efficient apparatus than available heretofore, for the detection of light beam modulation signals using the principle of heterodyning with a locally produced signal of microwave frequency.

The foregoing and other objects are realized by a receiver which employs a light sensitive detector whose response characteristics can be varied by impressing a voltage across the detector. By impressing a locally generated voltage signal across the detector while the modulated laser beam shines thereon, a moderate frequency beat signal is obtained, which can be further processed. The use of a proper detector is important in obtaining a beat signal of large amplitude. Ordinary photoelectric cells such as those constructed with a layer of cadmium sulphide, or bulk crystals of cadmium sulphide, can be used to detect modulated light, but when used in heterodyne detection the output is low. Cadmium sulphide (CdS) or other compounds of the II–VI valence type have high light amplitude sensitivity so that they yield large voltage variations for small variations in the amplitude of incident light. However, they do not display a large change of sensitivity to amplitude or frequency changes in the incident light with the application of a bias. As a result, only a very small amplitude of beat frequency voltage is produced when the crystal is subjected to both a high frequency heterodyning bias and a frequency and/or amplitude modulated incident light beam. Accordingly, such cells do not readily detect amplitude and frequency modulated laser beams. Ordinary photoelectric cells also have other disadvantages such as limited response time, which make detection of microwave frequency modulating signals difficult.

An efficient detector is obtained by using two pieces of n-type semiconductor material united by a grain boundary (p-type) to form two junctions. A beam of modulated light to be detected is focused on one of the junctions. The photovoltage (the voltage across the detector due solely to the incident light) across the ends of the detector lying on each side of the double junction varies with amplitude and frequency of the incident light. It is found that when a voltage is impressed across these same ends of the detector, the detector becomes more sensitive to different frequencies; i.e., there is a shift or extension in spectral response (that is, the photosensitivity extends to frequencies much higher and lower than previous cut-off frequencies). In order to detect the modulating signal of a light beam focused on the junction, a local microwave mixing or heterodyning voltage is impressed between the p and n materials. The local microwave mixing voltage, which is generally of a frequency between several hundred megacycles and several hundred kilo-megacycles, causes an oscillation of the level of resistance and of the photovoltage while the variation of light amplitude or frequency due to the light beam modulating signal also causes a variation of resistance and photovoltage. The net result is a variation of resistance and photovoltage and therefore of voltage across the crystal, as a function of the product of the local microwave signal and the received light beam modulating signal. Thus, the local and received signals are mixed or heterodyned, and the voltage across the crystal includes the beat frequency of the locally generated and received microwave signals. The beat frequency can then be amplified and utilized. The detection of the beat frequency by heterodyning in the foregoing manner yields a high signal-to-noise ratio with received signals of very low power.

The type of light-sensitive material utilized in the heterodyne detection of modulated light and the construction of the detector is an important factor in enabling the detection of weak signals. The variation in spectral response, which largely determines the heterodyning capability for frequency modulated laser beams, is a function of the effective width of the junction between the p and n material, and of the voltage applied across the junction. The shift in spectral response and sensitivity with applied voltage, generally referred to as the Franz-Keldysh phenomenon, is a result of the high electric field across a junction; a field of $10^5$ to $10^6$ volts per centimeter generally being required. Ordinary p-n crystals of the type used in junction transistors have a wide junction or depletion layer, such as $10^{-3}$ to $10^{-4}$ cm. in width, and several hundred volts are sometimes required to attain the field intensity required for appreciable spectral shift. Bicrystals, which comprise a crystal with a dislocation plane separating it into two crystals, have the equivalent of very thin junctions, such as $10^{-5}$ to $10^{-6}$ cm. or less, and it is found that less than one volt creates a large shift or extension in spectral response. Accordingly, in some embodiments of the invention, bicrystals are employed as the light sensitive material upon which the laser beam is focused. It may be noted that the magnitude of photovoltage (due to incident light) is a linear function of bias, such as is caused by a local heterodyning voltage. Thus, a bicrystal displays linear mixing characteristics, with a minimum of frequencies other than the sum and difference frequencies.

The novel features that are considered characteristic of this invention are set forth with particularity in the appended claims. The invention itself, both as to its organization and method of operation, as well as additional objects and advantages thereof will best be understood from the following description when read in connection with the accompanying drawings, in which:

FIGURE 1 is a partial pictorial view of the mixer head of an optical receiver constructed in accordance with the invention; and FIGURE 2 is a graphical representation of the response characteristics of a bicrytsal showing the changes in photovoltage with the application of bias.

Reference is now made to FIGURE 1 which illustrates a receiver for detecting a laser beam of frequency such as $5\times10^{14}$ c.p.s. which is modulated by a microwave signal of a frequency such as 10 gc.p.s. ($10\times10^9$ cycles per second). The modulating microwave signal is itself modulated by lower frequency signals, such as 0.5 gc.p.s. ($0.5\times10^9$ cycles per second). The receiver comprises a waveguide 10 having an aperture covered by a convex lens 12. A detecting crystal 14, such as a junction crystal or a bicrystal, is centrally disposed in the waveguide at the center of focus of the lens 12 so that collimated light beams incident normally on the lens are brought to a focus on junction 16 to change the voltage and resistance between the ends 18 and 20 of the crystal.

A coaxial cable 22 joined to the waveguide 10 includes an outer conduit 24 in contact with the walls of the waveguide and a central conductor 26 connected to one end 18 of the crytsal. The other end 20 of the crystal is directly connected to the waveguide walls. A metal disk 30 attached to the central conductor 26 and disposed on a separator disk of mica 28, serves as a capacitive coupling between the central conductor and the walls of the waveguide to "short" currents of very high frequency such as 10 gc.p.s. and higher, while having little effect on currents of lower frequency such as 0.5 gc.p.s.; i.e., it functions as a low pass filter for the coaxial cable.

A modulated laser beam is detected by positioning the receiver so that the beam shines on the lens 12 and normal to it, to enable focusing of the beam on the junction 16 of the crytsal. At the same time, a heterodyning microwave, generated by a local oscillator such as a klystron tube, is conducted through the waveguide 10. A tuner 32 is adjusted to provide a voltage across the crystal; for maximum voltage, the tuner is adjusted to provide a space between the crystal and tuner (rod) of a quarter wavelength or three-fourths cm. for 10 gc.p.s. heterodyning microwave.

The incidence of a light beam on the crystal junction 16 creates a photovoltage between the ends 18 and 20 of the crystal. Inasmuch as the photovoltage varies with amplitude and frequency of the incident light, an incident laser beam having a modulating signal of 10 gc.p.s. produces a photovoltage variation between the crystal ends of approximately 10 gc.p.s. Additionally, the local heterodyning microwave signal, which produces a 10 gc.p.s. voltage or bias across the ends 18 and 20 of the crystal, causes a change in spectral and amplitude response; i.e., a change in the photovoltage produced at each frequency and amplitude of the incident light. The resulting voltage between the ends 18 and 20 of the crystal includes a product of the approximately 10 gc.p.s. laser beam modulating wave and the 10 gc.p.s. local heterodyning mircowave. This product includes the sum frequency of 20 gc.p.s. and the difference frequency.

A difference frequency between the local heterodyning microwave signal and the laser beam modulating signal results from the fact that the latter is not a constant, but varies in frequency or amplitude; e.g., by 500 mc.p.s. (500 megacycles per second). The 500 mc.p.s. variation represents an information signal impressed on, or modulating, the 10 gc.p.s. signal of the laser beam.

Both the 20 gc.p.s. and 500 mc.p.s. difference signals are conducted by the central conductor 26 of the coaxial cable 22. However, the capacitance coupling between the disk 30 and the walls of waveguide 10 causes a short circuit of the 20 gc.p.s. signal, and only the 500 mc.p.s. signal passes down the cable 22 (with only slight attenuation). A matching tuner 34 is provided to efficiently couple the cable 36 to the waveguide. The cable 36 is connected to equipment for further processing of the 500 mc.p.s. signal in accordance with techniques well known in the electronic art.

As previously stated, the particular type of crystal 14 used determines the sensitivity of the detector. In many applications the crystal 14 is preferably of the type generally referred to as a bicrystal, such crystals generally including a grain boundary junction which is very sensitive to light, due to a carrier multiplication effect. Bicrystals are especially useful in receivers constructed according to the present invention although junction transistors can be used.

Crystals of the type used in junction transistors include a piece of material such as germanium with n type and p type regions. The width of the junction, or barrier layer, is a function of the doping of the materials (the width is inversely proportional to square root of doping). Typically, the n type doping is $10^{16}$ atoms cm.$^{-3}$ ($10^{16}$ atoms per cubic centimeter), the p type doping is $10^{14}$ atoms cm.$^{-3}$, and the junction width is of the order of magnitude of $10^{-3}$ cm. Doping can be increased to reduce junction width and increase spectral shift, but then the sensitivity or change in resistance with incident light at constant bias, is low.

The detection sensitivity in mixers without a second light source is dependent upon the change in photo-voltage or resistance with the application of a bias across the crystal, this change being roughly proportional to the electric field intensity across the junction. For a wide junction, a very large voltage is required to produce a large electric field. A high voltage leads to heating, breakdown, junction noise, and other undesirable effects and is preferably avoided.

Bicrystals typically comprise a crystal having a dislocation plane extending across the entire crystal width. A method for making such crystals is described in H. F. Mataré and H. A. R. Wegener, Zeitschrift für Physik, 148, p. 631 (1957). In ordinary junctions, the response time constants are limited by doping interference with the junction performance, the higher the doping the greater the response time. In bicrystals, large doping, such as $10^{18}$ atoms per cubic centimeter can be employed due to the highly degenerate grain boundary plane, and fast response times are attained. The sensitivity of bicrystals is as high as that of the best photodevices and, as pointed out above, this sensitivity can be obtained in a bicrystal together with large bias-caused spectral shift characteristics. The shift in characteristics is almost proportional to bias change for a bicrystal so that the beat frequencies are strong while other frequencies are of small amplitude.

The change in response characteristic with application of bias in the case of a bicrystal is shown in FIGURE 2. The figure shows the photovoltage $V_p$ or resistance R between opposite faces of a bicrystal as a function of the frequency $f$ of incident light (for light of constant intensity), or conditions of bias and absence of bias. It can be seen that the relationship between photovoltage or resistance and frequency $f$ is strongly affected by the bias.

In optical frequency receivers of this invention, the high frequency of the local microwave signal and of the microwave modulating signal across the crystal results in decreased output for even small capacitances between the ends of the crystal. Capacitive coupling is reduced by constructing the crystal 14 so that it is narrow across its center, at the junction 16. Substantial reduction in capacitive coupling can be obtained without serious deleterious effects on crystal performance by this construction.

While the detection is described for a 500 mc.p.s. signal modulating a 10 ps.p.s. signal, which in turn modulates a laser beam, practical systems would generally involve many more signals. Generally, the 10 gc.p.s. signal would be modulated by many signals with frequencies of up to several gigacycles per second, the various signals being separated, after detection by a crystal, by passing through filters according to well known techniques. The detector of FIGURE 1 is suitable for such detection, where appropriate filtering or other detection apparatus is connected to the cable 36.

Although a particular embodiment of the invention has been described in detail, many other light beam or other extremely high frequency modulated beam detectors can be constructed in accordance with the teachings of the invention. Accordingly, the invention is not limited to the particular described embodiment, but only by a just interpretation of the following claims.

I claim:

1. A receiver for modulated optical frequency beams, comprising:

a bicrystal including a junction area sensitive to optical frequency electromagnetic waves, said bicrystal having electrical characteristics which vary according to the frequency of electromagnetic waves incident thereon and also according to voltages impressed thereacross;

lens means for directing a modulated electromagnetic beam of optical frequencies on said junction area of said bicrystal;

means for impressing, across said junction area of said bicrystal, a local heterodyning signal of the same order of magnitude as the highest modulating frequency of said modulated electromagnetic beam to produce beat frequency signals therewith; and conductor means for conducting said beat frequency signals to detector means, said conductor means including low pass filter means for preventing the conduction of high, sum frequency, beat signals to the detector means.

2. A receiver for modulated electromagnetic light beams of optical frequencies, comprising:

a waveguide;

a waveguide tuner for conductively connecting all walls of said waveguide;

oscillator means for producing a microwave heterodyning signal and directing it through said waveguide towards said tuner;

a bicrystal having a p-n junction of the dislocation type and characterized by a resistance thereacross which varies in accordance with the frequency of light incident on said junction for light of constant amplitude and also characterized by an extension in spectral sensitivity in accordance with voltages impressed across said bicrystal, said bicrystal being positioned at a distance of substantially one-quarter wavelength of said heterodyning signal from said tuner and having a first end connected to a first wall of said waveguide;

a coaxial cable having an outer conductor in electrical contact with a second wall opposite to said first wall of said waveguide, said cable having an inner conductor connected to a second end of said bicrystal;

a conductor disk attached to said inner conductor and disposed on a nonconducting disk separating said conductor disk from said outer conductor, for providing a low pass capacitive coupling between said inner conductor and said second wall of said waveguide;

lens means positioned in a third wall of said waveguide, said third wall connecting said first wall to said second wall, said heterodyning signal being impressed across said bicrystal and said lens means directing modulated electromagnetic waves of optical frequencies on said junction to produce a beat frequency signal across said bicrystal; and means connected to said coaxial cable for detecting said beat frequency signal, said low pass capacitive coupling preventing the conduction of the sum frequencies of said heterodyning and beam modulating signals to said detecting means.

3. A receiver for modulated electromagnetic waves of optical frequencies, comprising:

a waveguide;

a waveguide tuner for conductively connecting all walls of said waveguide;

oscillator means for producting a microwave heterodyning signal and directing it through said waveguide towards said tuner;

a bicrystal having a p-n junction characterized by a photovoltage thereacross which varies in accordance with the frequency of electromagnetic waves incident on said junction and also characterized by an extension in spectral sensitivity in accordance wtih voltages impressed across said bicrystal, said bicrystal being positioned at a distance of substantially one-quarter wavelength of said heterodyning signal from said tuner and having a first end connected to a first wall of said waveguide;

a cable having a first conductor in electrical contact with a second wall opposite to said first wall of said waveguide, said cable having a second conductor connected to a second end of said bicrystal;

means providing a low pass filter connecting said second conductor to said second wall of said waveguide;

lens means positioned in a third wall of said waveguide, said third wall connecting said first wall to said second wall, said heterodyning signal being impressed across said bicrystal and said lens means directing modulated electromagnetic waves of optical frequencies on said junction to produce a beat frequency signal across said bicrystal; and means connected to said cable for detecting said beat frequency signal, said low pass filter means preventing the conduction of the sum frequencies of said heterodyning and beam modulating signals to said detecting means.

4. A receiver as defined in claim 3 wherein said heterodyning signal is of an amplitude which produces a voltage across said bicrystal of the order of magnitude of no more than several volts.

5. A receiver as defined in claim 4 wherein said bicrystal includes a portion of p type material and a portion of n type material forming an optical frequency sensitive junction, said portions of material being of continuously and progressively increasing cross sectional area with distance from said junction, whereby capacitive coupling between said portions of p and n type materials is substantially reduced.

(References on following page)

References Cited

UNITED STATES PATENTS

| | | | |
|---|---|---|---|
| 2,582,850 | 1/1952 | Rose | 250—211 |
| 2,670,441 | 2/1954 | McKay | 317—235 |
| 3,170,067 | 2/1965 | Kibler | 307—88.5 X |
| 3,196,274 | 7/1965 | Giordmaine | 250—199 |
| 3,237,011 | 2/1966 | Sterzer | 250—199 |
| 3,245,314 | 4/1966 | Dillon | 250—199 X |
| 3,259,015 | 7/1966 | Marcatili | 250—199 X |

ROBERT L. GRIFFIN, *Primary Examiner.*

A. J. MAYER, *Assistant Examiner.*